United States Patent
De Diego Reyes et al.

(10) Patent No.: US 8,813,790 B2
(45) Date of Patent: Aug. 26, 2014

(54) DEVICE FOR PROTECTING A THREADED TUBULAR COMPONENT AND TUBULAR COMPONENT PROVIDED WITH THE DEVICE

(75) Inventors: Arturo De Diego Reyes, Veracruz (MX); David Ontiveros Carmona, Veracruz (MX)

(73) Assignee: Vallourec Oil and Gas France, Aulnoye-Aymeries (FR)

( * ) Notice: Subject to any disclaimer, the term of this patent is extended or adjusted under 35 U.S.C. 154(b) by 670 days.

(21) Appl. No.: 13/056,807

(22) PCT Filed: Jul. 9, 2009

(86) PCT No.: PCT/EP2009/058766
§ 371 (c)(1),
(2), (4) Date: May 3, 2011

(87) PCT Pub. No.: WO2010/015484
PCT Pub. Date: Feb. 11, 2010

(65) Prior Publication Data
US 2011/0203698 A1   Aug. 25, 2011

(30) Foreign Application Priority Data
Aug. 5, 2008   (FR) ...................................... 08 04461

(51) Int. Cl.
*B65D 59/06*   (2006.01)
*B65D 59/00*   (2006.01)
*F16L 57/00*   (2006.01)

(52) U.S. Cl.
USPC ........................................ 138/96 T; 138/96 R

(58) Field of Classification Search
CPC ........ F16L 57/00; F16L 57/005; B65D 59/00; B65D 59/06
USPC .............................. 138/96 T, 89, 96 R, 90–95
See application file for complete search history.

(56) References Cited

U.S. PATENT DOCUMENTS

| | | |
|---|---|---|
| 1,853,945 A | 4/1932 | Unke |
| 4,020,873 A | 5/1977 | Palarino |
| 4,655,256 A | 4/1987 | Lasota et al. |

(Continued)

FOREIGN PATENT DOCUMENTS

| | | |
|---|---|---|
| JP | 58-174472 U | 11/1983 |
| JP | 62-283292 A | 12/1987 |

(Continued)

OTHER PUBLICATIONS

International Search Report Issued Oct. 6, 2009 in PCT/EP09/058766 filed Jul. 9, 2009.

*Primary Examiner* — Paul R Durand
*Assistant Examiner* — Vishal Pancholi
(74) *Attorney, Agent, or Firm* — Oblon, Spivak, McClelland, Maier & Neustadt, L.L.P.

(57) ABSTRACT

A device for protecting the end of a tubular component, the end including a first threaded zone. The device includes a protecting end including a second threaded zone configured to cooperate with a first threaded zone of the tubular component, and a ring configured to cover a portion of the outer surface of the end of the tubular component. The ring is bound up with the protecting end such that the ring is free to turn about itself independently of the end. Such a device may find application to components used for drilling and operating hydrocarbon wells, for example in particular expandable components.

14 Claims, 1 Drawing Sheet

(56) References Cited

U.S. PATENT DOCUMENTS

| | | |
|---|---|---|
| 4,809,752 A | 3/1989 | Strödter |
| 6,196,270 B1 | 3/2001 | Richards et al. |
| 6,564,875 B1 | 5/2003 | Bullock |
| 6,976,711 B2 | 12/2005 | Sivley, IV |
| 7,469,938 B2 | 12/2008 | Sivley, IV |

FOREIGN PATENT DOCUMENTS

| | | |
|---|---|---|
| JP | 8-217130 A | 8/1996 |
| JP | 2000-18231 A | 1/2000 |
| JP | 2002-516974 A | 6/2002 |
| JP | 2005-523404 A | 8/2005 |
| WO | WO 99/61836 A1 | 12/1999 |
| WO | WO 03/089162 A2 | 10/2003 |
| WO | WO 03/089162 A3 | 10/2003 |

DEVICE FOR PROTECTING A THREADED TUBULAR COMPONENT AND TUBULAR COMPONENT PROVIDED WITH THE DEVICE

The present invention relates to a device for protecting the end of tubular components comprising a threading and used in operating hydrocarbon wells or geothermal wells. The invention also relates to a tubular component provided with a protective device for its threaded end.

Such tubular components may, for example, consist of a great length tube or a coupling, comprising a female threading at one end intended to be connected to the end of another tube provided with a male threading.

Said tubular components are used in particular to produce sealed casing strings or tubing strings for hydrocarbon wells or for similar wells such as geothermal wells.

More particularly, the invention concerns the protection of the threaded ends of tubular components known as "expandable". The term "expandable tubular components" means tubular components which undergo an expansion of their diameter of the order of 15% to 25% once installed in the well. The expansion operation is a plastic deformation of the string which is carried out by passing a mandrel through the string with an external diameter which corresponds to the internal diameter which is to be reached for the string. The expansion operation is mainly carried out on casing strings when they are to be plugged or strengthened, and on tubing strings when the well production is to be increased.

The main difficulty with expansion operations is the connections between the tubular components which form the string. The tubular components are provided with complementary male/female threaded ends which are connected together by makeup. However, the threaded ends are zones which are extremely critical since they are thin. Further, when these ends are subjected to shocks or to friction bringing about impacts, scratches or micro-cracks, the expansion operations, which plastically deform the tubular components, may induce a propagation of the cracks up to the threaded end. This phenomenon is a particular problem because this defect may result in breakage of the string at the connection or to a lesser extent in a loss of the seal of the connection.

In order to overcome that problem, it is thus necessary to protect the threaded ends of the tubular components against shocks, when said tubular components are manipulated on production lines, in all of the transport phases or on site.

After consulting the prior art, it appears that the various solutions proposed generally consist of screwing at the end of the tubular component a protective device which is suitable to cover the outer surface of the end of the tubular component. The specifications concerning the protection of tubular components against shocks are defined in API (American Petroleum Institute) Standard Annexe I of volume 5CT.

As an example, document U.S. Pat. No. 6,564,875 describes a device for protecting the end of a component both at the female threading and at the outer surface of the end. More particularly, FIG. 1 shows that the protective device is constituted by a tubular ring 120 which is suitable to cover the outer surface of the end 135 and a protecting end 110 which is suitable to be screwed into the female end of the tubular component. As mounted, the female end, the ring and the protecting end are bound up and fixed to each other. The protecting end is solidly screwed into the female end, clamping the collar 132 of the tubular ring.

However, the device described suffers from the following disadvantage: during transport or handling of the tubular components, said components and as a result the ring of the protective device are caused to roll. The ring then causes the protecting end to rotate, which depending on the direction of rotation, may cause the protecting end to unscrew from the protective device.

In other prior art, a protector has been used for an expandable connector composed of two portions assembled by screws, the first portion being screwed inside the connection and the second portion surrounding the end of the connection. However, when the protector sustains a shock, the screws pass through the plastic protector and strike the connection.

For this reason, the invention aims to overcome the problems of unscrewing of the protective device without risking damage to the tubular component.

The invention concerns a device for protecting the end of a tubular component, said end comprising a first threaded zone, the device comprising a protecting end provided with a second threaded zone which is suitable to cooperate with the first threaded zone of the tubular component, and a ring which is suitable to cover a portion of the outer surface of the end of the tubular component, characterized in that the ring is bound up with the protecting end, such that the ring is free to turn about itself independently of the protecting end.

According to certain characteristics, the tubular component comprises a first female threaded zone, the protecting end comprising a second threaded male zone which is suitable to cooperate with the first.

In accordance with other characteristics, the protecting end and the ring are latched.

In accordance with other characteristics, the latching is constituted by a groove formed in the protecting end and at least one pin fixed on the ring.

In accordance with a preferred embodiment, the latching is constituted by a groove formed in the protecting end, the ring comprising three pins which are equidistant from each other.

In accordance with other characteristics, the outer surface of the ring comprises flutes extending in a direction near to the axis of revolution of the ring.

In accordance with other characteristics, the ring and the protecting end are formed from synthetic shock-absorbent material.

In accordance with other characteristics, the ring and the protecting end are formed from high density polyethylene.

In accordance with other characteristics, the device comprises a means for stiffening the protecting end.

The invention also aims at an assembly constituted by a tubular component provided with an end protected by a device in accordance with an embodiment of the invention.

In accordance with certain characteristics, the ring extends along the outer surface of the end by a distance which is greater than or equal to half the length of the female threaded zone.

In accordance with other characteristics, a clearance of at least 2 mm is provided between the ring and the outer surface of the end.

In accordance with other characteristics, the tubular component is a component selected from expandable casings, expandable tubings and expandable couplings.

Other advantages and characteristics of the invention will become apparent from the following detailed description of non-limiting examples given and from the accompanying drawings which thus not only serve to provide a better understanding of the invention but also, if necessary, contribute to its definition.

Figure 1:
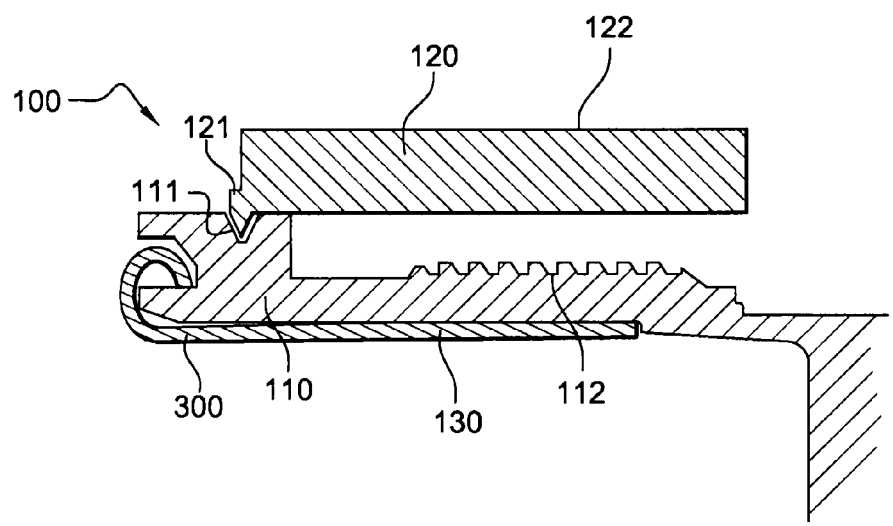
FIG. 1 shows a partial longitudinal sectional view of a protective device in accordance with one implementation of the invention, applied to protect an end of a tubular component having a female threading.

FIG. 1 shows a partial longitudinal sectional view of a protective device 100 having a protecting end 110 with a generally cylindrical shape as well as a ring 120. The protecting end 110 and the ring 120 are bound up in the sense that one cannot be displaced without the other. However, the ring 120 may turn about itself independently of the protecting end 110.

In this implementation of the invention, the device is intended to protect a portion of the outer surface of the end of a tubular component comprising a female threading. Said tubular component is not shown in FIG. 1. The protecting end 110 has a male threaded zone 112 dimensioned for screwing onto the female threaded zone of the tubular component. The term "threaded zone" means any zone belonging to the peripheral surface of the tubular component and which comprises a threading, the threading possibly being continuous, interrupted, regular, irregular, etc. Usually, the tubular components comprise threaded zones which satisfy the specifications of the API standard. Still in accordance with the invention, the diameter of the ring 120 is selected to surround the end of the tubular component.

Advantageously, the protecting end 110 and the ring 120 are bound up by a latching fixation means. This type of attachment has the advantage of rapid and cheap assembly of the protecting end and the ring.

Advantageously, latching is constituted by a groove 111 formed in the protecting end 110 and at least one pin 121 fixed on the ring 120, the pin 121 being dimensioned so as to be latched in a mobile manner in the groove 111. The cooperating groove 111 and pin 121 constitute elements which are simple to manufacture.

It should be noted that in a variation not shown in the figures, it is also possible to produce the groove in the ring and to fix the pin on the protecting end.

Preferably, the ring is provided with three pins 121 distributed in an equidistant manner to strengthen the binding up of the ring 120 onto the protecting end 110.

Advantageously, the outer surface 122 of the ring 120 comprises flutes, not shown in the figure, extending in a direction near to the axis of revolution of the ring 120. Thus, when several stacked tubular components are jolted together, the protective devices dampen the shocks, in particular by transmitting their rotational movement when they come into contact thanks to the flutes.

Advantageously, the device comprising the ring 120 and the protecting end 110 is constituted by a shock-absorbent material.

Advantageously, the ring 120 and the protecting end 110 are formed from high density polyethylene, which enables to absorb shocks and also to produce pieces easily by moulding.

Clearly, it is possible to select another material, for example from the styrene plastic family (polystyrene, ABS, etc) or from polyolefinic plastics (high density polyethylene, polypropylene, etc).

Advantageously, the device comprises a means 300 which is suitable to stiffen the protecting end 110. This means may, for example, consist of a piece of sheet metal which matches the periphery of the protecting end at the locations which are to be reinforced.

Figure 2:
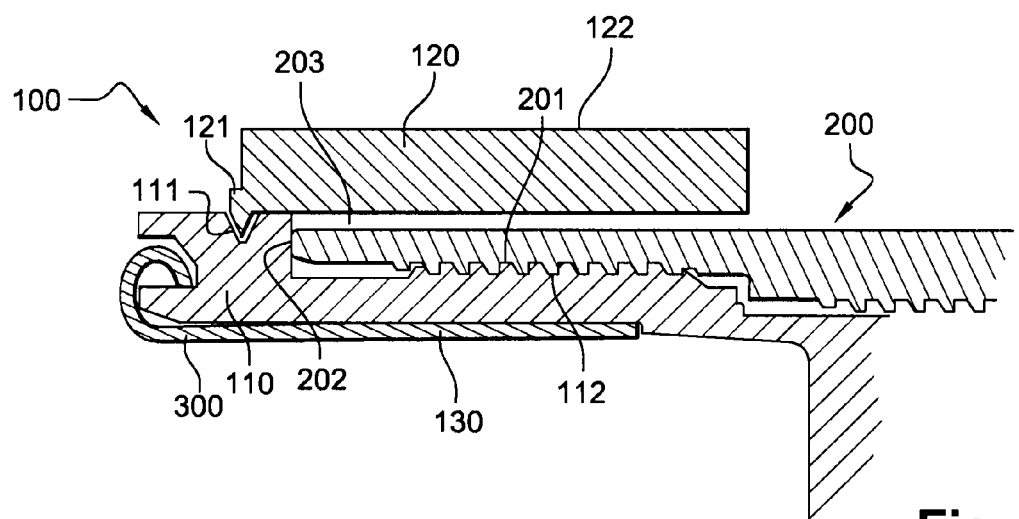
FIG. 2 shows a partial longitudinal sectional view of an assembly constituted by a protective device screwed onto a tubular component comprising a female threading, in accordance with one implementation of the invention.

FIG. 2 shows an assembly constituted by the end 200 of a tubular component provided with a female threaded zone 201 and a protective device 100 in accordance with the invention, in which a protecting end 110 comprises a male threaded zone 112 screwed into the female threaded zone 201 located at the end 200 of the tubular component. A ring 120 partially covering the outer surface of the end 200 of the tubular component is bound up with and freely rotatable about the protecting end 110.

Advantageously, the protective device preferably comprises the characteristics described above. More precisely, the ring 120 is latched onto the protecting end 110, latching being carried out by means of a groove 111 formed in the protecting end 110 and by means of at least three pins fixed on the ring 120. Similarly, the protecting end and the ring are produced by moulding in high density polyethylene. Similarly, the ring comprises flutes which extend longitudinally (and are not shown in FIG. 2).

Advantageously, the ring extends from the end 200 of the tubular component over a distance of at least equal to half the length of the threaded female zone. As an example, for a threading length of 131 mm, the ring 120 must have a length of 65.5 mm. For this reason, the end 200 which has a minimum thickness of 3.65 mm, constituting a particularly fragile zone, is protected.

Advantageously, a clearance of at least 2 mm is provided between the ring 120 and the outer surface of the end 200, such that the ring cannot rub on said outer surface when the tubular components come into contact with each other.

The tubular components may be casing tubes, tubing tubes or couplings used in operating hydrocarbon wells or geothermal wells and may also be intended to undergo diametral expansion.

Of course, the invention may also be applied to tubular components used in operating hydrocarbon wells or geothermal wells and being thin at their ends. The term "thin" means thicknesses of the order of millimeters.

Thus, when several stacked tubular components come into contact at their ends, the rings and not the protecting ends come into contact, thus preventing the protecting ends from unscrewing.

The invention may also be applied to protecting the end of a tubular component provided with a male threaded zone. In this case, and not shown in the figures, the outer surface of the end of the tubular component has a threaded zone onto which the protecting end is screwed. The ring is then mounted for free rotation on the protecting end and covers a portion of the protecting end and the outer surface of the end.

Thus, when several stacked tubular components come into contact at their ends, the rings and not the protecting ends come into contact, thereby preventing the protecting ends from unscrewing.

The invention claimed is:

1. A device for protecting an end of a tubular component, the end including a first threaded zone, the device comprising:
    a protecting end including a second threaded zone configured to cooperate with the first threaded zone of the tubular component; and
    a ring configured to cover a portion of an outer surface of the end of the tubular component,
    wherein the ring is bound up with the protecting end before being mounted on the device such that the ring is free to turn about itself independently of the protecting end,
    wherein the ring and the protecting end are bound up at a location which is axially offset from the tubular component by a latching, and
    wherein the latching includes a groove formed in the protecting end and at least one pin fixed on the ring.

2. A device according to claim 1, wherein the second threaded zone of the protecting end is a male threaded zone, and the first threaded zone of the tubular component is a female threaded zone.

3. A device according to claim 1, wherein the latching includes a circumferential groove formed in the protecting end, and three pins that are equidistant from each other.

4. A device according to claim 1, wherein the ring and the protecting end are formed from synthetic shock-absorbant material.

5. A device according to claim 1, principally made of high density polyethylene.

6. A device according to claim 1, wherein the device further comprises means for stiffening the protecting end.

7. An assembly comprising a tubular component including an end protected by a device in accordance with claim 1.

8. An assembly according to claim 7, wherein the ring extends along the outer surface of the end by a distance that is greater than or equal to half the length of the first threaded zone.

9. An assembly according to claim 7, wherein a clearance of at least 2 mm is provided between the ring and the outer surface of the end.

10. An assembly according to claim 7, wherein the tubular component is a component selected from expandable casing tubes, expandable tubing tubes, expandable couplings.

11. A device according to claim 1, wherein the first threaded zone includes a threaded surface and a smooth surface opposite the threaded surface, the second threaded zone cooperates with the threaded surface of the first threaded zone, and the ring covers a portion of the smooth surface of the first threaded zone.

12. An assembly comprising a tubular component including an end protected by a device in accordance with claim 11.

13. An assembly according to claim 12, wherein the ring extends along the smooth surface of the first threaded zone of the tubular component by a distance that is greater than or equal to half the length of the threaded surface.

14. An assembly according to claim 12, wherein a clearance of at least 2 mm is provided between the ring and the smooth surface of the first threaded zone of the tubular component.

* * * * *